A. J. EMLAW.
GRAIN-CONVEYER.

No. 190,427. Patented May 8, 1877.

Witnesses
Charles A. Renwick
Frederic W. Paine

Inventor.
Andrew J. Emlaw
By Taggart Saunders Fletcher
attys.

UNITED STATES PATENT OFFICE.

ANDREW J. EMLAW, OF GRAND HAVEN, MICHIGAN.

IMPROVEMENT IN GRAIN-CONVEYERS.

Specification forming part of Letters Patent No. 190,427, dated May 8, 1877; application filed October 16, 1875.

*To all whom it may concern:*

Be it known that I, ANDREW J. EMLAW, of the city of Grand Haven, county of Ottawa and State of Michigan, have invented a new and useful Grain-Conveyer, used for transferring grain from one point to another, of which the following is a specification:

The object of my invention is to construct a simple and effective machine for transferring grain from one part of a ship or boat to another; thus to move the grain from all parts of the hold of the ship to a point beneath the hatch, from whence it may be conducted to an elevator, or to carry or transfer the wheat or grain as it is deposited through the hatchway through the hold of the ship.

The nature of my invention refers to a grain-transferring machine constructed of one or more endless chains with flat or square links traveling over friction-pulleys and propelled by cog-wheels, and within tight casings or ways, the casings being provided with valves so arranged that the grain may be received or discharged in any part of the hold of the ship.

In operating my invention I use four chains in an ordinary wheat-vessel, arranged in the following manner: On either side of the keelson, in the bottom of the boat, I place a tight casing of sufficient size to allow the chain to move freely through it. This casing is provided with a series of valves opening from its upper side, so arranged that all or any one or more may readily be opened at a time. Immediately beneath the deck, and directly over the lower ways, are two other ways, through which the endless chains pass. The upper ways are provided with valves opening from the lower side, and so arranged that one or more can be opened at pleasure. At or near the hatchway is placed a cog-wheel for each endless chain, by means of which wheels the motion is given to the chains. The lower casing for each chain is so constructed that the grain is raised near the hatchway and discharged through a discharge-pipe or tube. The chains pass over friction-rubbers arranged at each turn or angle of the chain.

Figure 1:
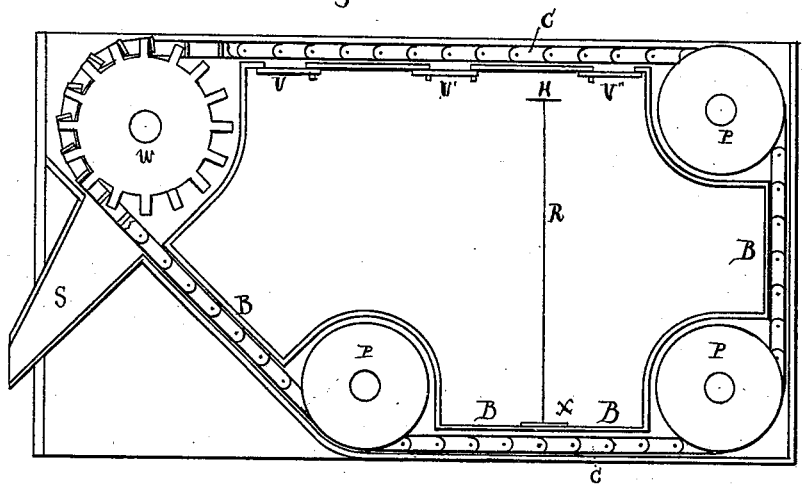
Figure 2:
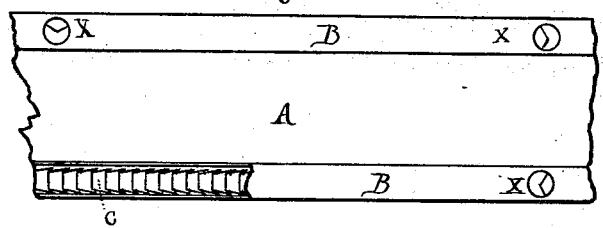

In the drawings, Figure 1 shows a plane side view of one chain with power-wheel, pulleys, casing, discharge-pipe, and valves. Fig. 2 shows the arrangement of the chains and casings in the bottom of the vessel on either side of the keelson, with the lower valves.

In Fig. 1, W represents the cog-wheel, which operates the endless chain C C; P P P, the friction-rollers; $v$ $v'$ $v''$, the valves beneath the upper casing; and $x$ $x$ the valves in the upper part of the lower casing B; S, the discharge-pipe which opens beneath the hatch, and at a convenient point to discharge the grain at the foot of the elevator-leg.

In Fig. 2, A represents the keelson of the ship; $x$ $x$ $x$, the valves in the lower casing. These valves may be placed at any desired distance apart. C shows the shape of the chain and its arrangement in the casing.

The operation of my invention is as follows: In unloading a ship to which my invention is attached, one or more of the valves in the lower casing are opened, and the chain, by means of the cog-wheel W, set in motion, so that the chain passes forward and up past the discharge-pipe S. The vessel being filled with grain, and there being a slope from the sides down to the lower casings beside the keelson, the whole cargo is discharged through the pipe S, and from thence carried up by means of the elevator-leg. In loading a vessel, the same motion of the chain is continued, and the grain is caused to fall upon the upper cord of the chain near the hatch, from which point it is carried toward the end of the ship, and may be dropped or discharged from the upper casing at any point desired by opening a valve. The chain should extend from near the hatch to the end of the hold in front, and from the hatch to the back end of the hold.

In order to work my device perfectly, I deem four chains desirable for a single vessel, but do not confine my invention to any particular number of chains.

Instead of placing the valves $x$ $x$ in the top of the lower casing they may be placed in the sides of the casing with the same effect.

Having described my invention, what I claim to have invented, and desire to secure by Letters Patent, is—

1. The endless chain C, in combination with the upper and lower casings, each provided with valves, as described, and operated by means of the cog-wheel W and friction-pulleys P P P, substantially as described, and for the purpose set forth.

2. The lower casing, provided with valves $x\ x$, in combination with the endless chain C, elevator and discharge-pipe S, for the purpose of discharging the grain at the foot of the elevator-leg, substantially as described.

ANDREW J. EMLAW.

Witnesses:
EDWARD TAGGART,
CHARLES A. RENWICK.